Sept. 3, 1946.  P. T. GORTON  2,407,073
ALARM DEVICE FOR AUTOMOBILES
Filed July 29, 1944

INVENTOR
Paul T. Gorton.
BY
Harness, Dickey & Pierce.
ATTORNEYS.

Patented Sept. 3, 1946

2,407,073

UNITED STATES PATENT OFFICE 2,407,073

ALARM DEVICE FOR AUTOMOBILES

Paul T. Gorton, Grosse Pointe, Mich., assignor of fifty per cent to Hodgson S. Pierce, Detroit, Mich.

Application July 29, 1944, Serial No. 547,119

2 Claims. (Cl. 200—52)

This invention relates to an alarm device for automobiles and is of the type which is adapted to be set in operation upon unauthorized tampering with an automobile equipped therewith, the principal object being the provision of a switch for a device of the type described that is simple in construction, economical to build, and efficient in operation.

Objects of the invention include the provision of an automobile alarm device adapted to be rendered effective upon a parked automobile and which will cause the horn of the parked automobile to be sounded when any slight movement of the automobile occurs; the provision of a device of the type described that will cause a few short blasts of the automobile horn to sound upon the occurrence of any slight movement of the parked automobile body, and which will discontinue the operation of the horn as soon as the movement of the automobile body stops; the provision of a device of the type described that will be operative with equal efficiency regardless of whether the automobile is parked on a level surface or on a surface inclined therefrom; the provision of a device of the type described embodying a contact element adapted to be brought into closed circuit position under the force of gravity and including a co-operating contact element shiftable thereby during its movement under the influence of gravity; and the provision of a device of the type described including a pendulum operated contact element and an associated contact element surrounding the same and freely shiftable with respect to a support therefor so as to be automatically adjusted in accordance with the particular position of rest which the pendulum may assume in any case.

The above being among the objects of the present invention, the same consists in certain novel features of construction and combinations of parts to be hereinafter described with reference to the accompanying drawing, and then claimed, having the above and other objects in view.

Figure 1:
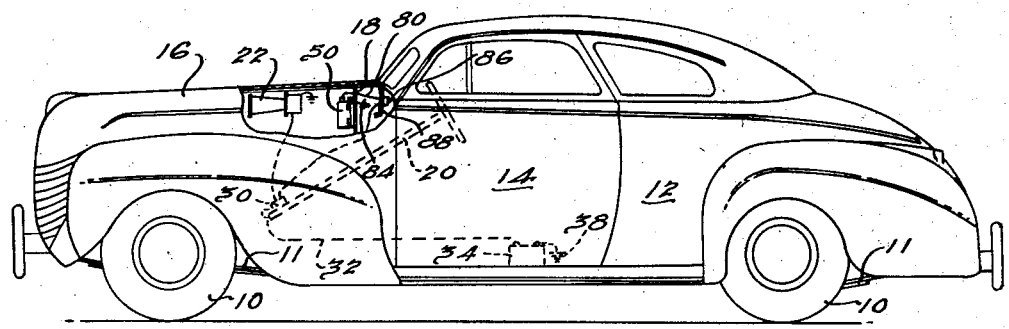
Figures 2, 3, 5:
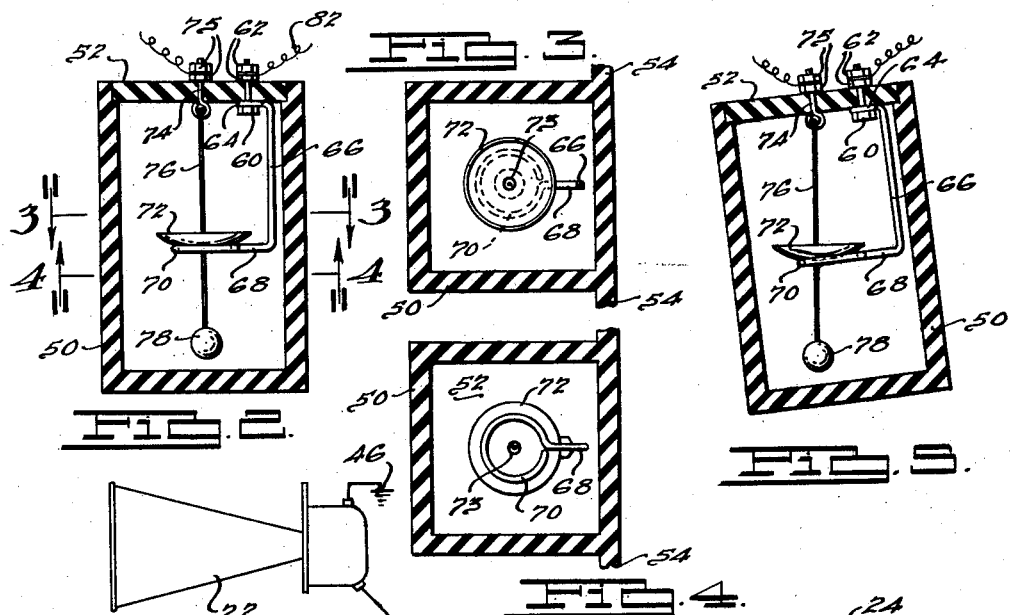
Figure 4:
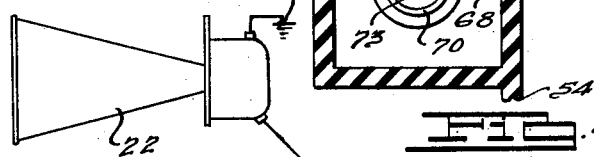
Figure 6:
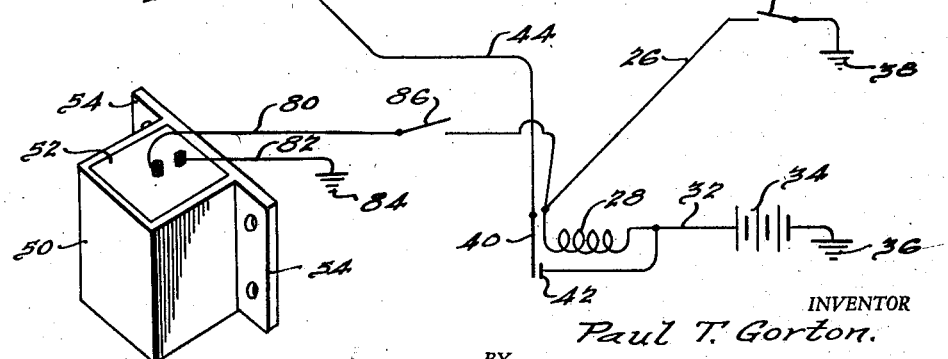

In the accompanying drawing which illustrates a suitable embodiment of the present invention and in which like numerals refer to like parts throughout the several different views, Fig. 1 is a partially broken side elevational view of an automobile equipped with an alarm system embodying a switch constructed in accordance with the present invention;

Fig. 2 is a vertical sectional view taken centrally through my improved switch;

Figs. 3 and 4 are transverse sectional views taken on the lines 3—3 and 4—4, respectively, of Fig. 2;

Fig. 5 is a view similar to Fig. 2 but illustrating the relation of the parts when the switch is tipped out of its normal vertical position; and, Fig. 6 shows my improved alarm switch in perspective view together with a diagrammatic representation of the wiring circuit therefor.

The present invention relates to a switch for use in that type of alarm system designed to cause the horn of an automobile to be blown in event the automobile is tampered with while parked. In other words, in an alarm system of this type when an automobile is parked the alarm system is energized and thereafter any appreciable unauthorized movement of the automobile acts to set off the alarm and cause a number of short blasts of the automobile horn, which blasts are discontinued as soon as the unauthorized movement of the automobile ceases.

The switch of the present invention is of that specific type utilizing the movement of a pendulum set in motion relative to the automobile through unauthorized movement of the latter to close the contacts through which the horn of the automobile may be energized. This general type of switch has been heretofore suggested for use in the type of alarm system described but as far as I am aware the constructions heretofore proposed for such type of switches have necessitated the automobile to be parked in perfectly level condition or otherwise the switch would be automatically closed and maintained in closed position, thus defeating the purpose of the alarm system in which it is associated. The present invention provides an improvement in such type of switches in that the switch automatically operates to adjust itself to the position which the cooperating automobile may assume when it is parked regardless of the level condition of the surface on which it rests within reasonable limits. In other words, the automobile may be parked on a surface which is materially out of level, either laterally or longitudinally of the automobile, and yet in accordance with the present invention the switch will automatically adjust itself to compensate for such non-level condition of the supporting surface for the automobile and thus will remain operative under all conditions.

Referring to the accompanying drawing a conventional automobile is illustrated in Fig. 1 as including wheels 10 secured to conventional axles (not shown) carrying springs 11, shown as leaf springs for the purpose of illustration, and which in turn support the body 12. The body 12 includes generally doors 14, an engine compartment enclosed by a hood 16 and a dash 18 at the rear end of the engine compartment. A steering gear 20 and a horn 22 are conventionally provided. A conventional horn push button or switch, indicated diagrammatically at 24 in Fig. 6, is conventionally mounted at the upper end of the steering column 20 and is connected by a wire 26, shown in Fig. 6, which extends down through the steering column 20 and connects to the coil 28 of a conventional horn relay switch indicated at 30 in Fig. 1 and conventionally mounted on the lower end of the steering gear at 20. The opposite side of the coil 28 is connected by an electrical lead 32 which leads to one side of the usual storage battery 34. The opposite side of the storage battery 34 is grounded as at 36 and the opposite side of the horn push button 24 is grounded as at 38.

As indicated in Fig. 6, the horn relay switch 30 includes an armature 40 and cooperating contact 42 the latter of which is connected to the lead 32 between the coil 28 and the battery 34. The armature 40 is connected by a lead 44 to one side of the horn 22 and the opposite side of the horn 22 is grounded as at 46. Consequently when the horn push button or switch 24 is closed the coil 28 is energized thus attracting the armature 40 and closing the contact between it and the contact 42 thus to close the circuit through the horn 22 and cause the latter to blow. The switch of the present invention is adapted to be connected into the horn push button circuit so that when its contact elements contact each other the coil 28 is energized thereby causing the circuit through the horn to be closed and causing the horn to blow.

It will be appreciated that it is not essential that the switch of the present invention be contained within an enclosure although it is preferably so arranged and when so enclosed the form of the enclosure may assume a wide variety of shapes and designs and may be made from a wide variety of materials. For the purpose of illustration in the drawing the enclosure is shown as consisting of a box-like structure 50 having an open top which is normally closed by a cover member 52. As best illustrated in Fig. 6 the enclosure 50 is preferably provided with a pair of supporting flanges 54 by means of which the switch of the present invention may be suitably supported on the automobile as, for instance, illustrated in Fig. 1 on the dash 18 thereof. The enclosure 50 and cover 52 therefor may be formed of any suitable nonconducting material such as rubber, plastic, wood, or the like.

A terminal screw or bolt 60 projects up through the cover 52 adjacent the rear edge of the enclosure 50 and above the cover is provided with a pair of nuts 62 thereon. Between the head of the screw 60 and the lower face of the cover 52 the circularly bent end 64 of a relatively rigid metal conductor surrounds the shank of the screw and is rigidly clamped by the head of the screw 60 to the cover 52. The conductor extends downwardly as at 66 from the cover 52 in preferably relatively close but adjacent relationship with respect to the rear wall of the enclosure 50 to a point preferably below the mid-point of the enclosure 50 and then turns at right angles thereto as at 68 and is then bent into a ring 70 positioned with its plane of thickness parallel to the plane of the cover 52 and preferably centrally positioned within the enclosure. Seated upon and supported by the ring 70 is a metallic disc or washer 72 which has a relatively small central opening 73 therein. The washer 72 may be flat but preferably is of partially spherical conformation as shown with the convex side resting against the ring 70 as it has been found that it maintains its shifted position more readily in such case than a flat disc or washer.

An eye screw or bolt 74 is projected up through the cover 52 centrally thereof with the eye bearing against the lower face of the cover 52 and a pair of nuts 75 are received thereon above the cover 52. A relatively thin but preferably stiff conductor wire 76 is loosely turned through the eye of the screw 74 so as to be universally movable with respect thereto and the conductor wire projects downwardly through the central opening 74 in the washer or disc 72 and adjacent the bottom of the enclosure 50 is provided with a weight 78 thereon. The conductor wire 76 and weight 78 being supported as described thus constitute a pendulum which is responsive under the force of gravity to any change in the position of the enclosure 50 so that, and as illustrated in Fig. 5, if the enclosure 50 is tipped from its normal vertical position illustrated in Fig. 2, the pendulum 76—78 in swinging to a vertical position will by engagement with the walls of the opening 74 in the washer or disc 72 cause the washer or disc 72 to slide on the ring 70 to accommodate such movement.

In practice and as best brought out in Fig. 6 one of the screws 60 or 74, shown as the screw 74, is connected by a lead 80 to the same side of the coil 28 of the horn relay switch 30 that the horn push button 24 is connected to, and the remaining screw, here shown as the screw 60, is connected to a lead 82 which is grounded as at 84. A manually operated switch 86, shown diagrammatically in Fig. 6 and which, when the alarm is built into an automobile in production may be built into the usual ignition switch mechanism so as to be closed when the ignition switch is opened, and vice versa, is interposed in the lead 80. Where the device is provided as an accessory, then the switch 86 is preferably mounted on the instrument panel 88 of the automobile as illustrated in Fig. 1. It will thus be appreciated that when the manually operated switch 86 is closed, whenever the stem 76 of the pendulum 76—78 contacts the wall of the opening 73 in the washer or disc 72 electrical current may flow from one side of the battery 34 through the coil 28 of the horn relay switch 30, then through the lead 80 to the screw 74, then through the stem 76 of the pendulum 76—78 to the washer 72, through the washer 72 and ring 70 and associated parts to the screw 60 and then through the lead 82 to the ground, thus energizing the coil 28 and drawing the armature 40 into contact with the contact 42 thus to cause the horn 22 to blow. The device of the present invention thus provides a switch mechanism in parallel with the horn push button switch 24 which, similarly to the horn push button switch 24, may be operated to cause the horn 22 to blow.

It will be appreciated, of course, that except at those times when the automobile is parked and when it is desired to protect it against unauthorized tampering the manually operated switch 86 will be open, but when the automobile is parked and left unattended and it is desired to protect it against tampering the manually operated switch 86 will be closed so as to condition the switch of the present device for effective operation.

In explaining the mode of operation of the switch of the present invention it is necessary to understand that a conventional automobile if parked and whether level or not, assumes a position in which the body and frame of the automobile are supported at equilibriums by the usual springs, such as the springs 11, connecting the automobile with the axles. If under such conditions some force is applied to the body of the automobile which tends to momentarily upset the equilibrium, as soon as such force is relieved the body will rock back and forth across its position of equilibrium and finally come to rest at its neutral or equalized position. An appreciable rocking movement of the automobile body will occur under such conditions. Thus, assuming for the moment that the automobile illustrated in Fig. 1 is at rest and in a position of equilibrium and with the stem 76 of the pendulum 76—78 extending through the central aperture 73 of the washer 72 in spaced relation with respect to the walls thereof, if some force is applied to the automobile body tending to rock it as above described the ring 70 will rock with the body while the pendulum will tend to remain in its normal vertical position. Therefore, a relative rocking action of the pendulum with respect to the washer will occur and will bring the stem of the pendulum into contact with the washer thus to close the circuit through the horn relay switch 30 and cause the horn 22 to blow. The automobile body after rocking to one extreme of its rocked position will then rock back towards the opposite extreme, breaking the contact between the stem of the pendulum and the washer 72, thus breaking the circuit to the horn, and will then re-establish such circuit when the stem of the pendulum contacts the opposite side of the hole 73 of the washer 72. This repeated making and breaking of the contact between the stem of the pendulum and the washer 72 will continue as long as the amplitude of rocking movement of the body is sufficient to continue such contact and will continue until the amplitude of movement is insufficient to make such contact or until the automobile body re-assumes its position of rest, at which time no further blowing of the horn will occur.

With the construction of the present invention should the rocking of the automobile body be of greater amplitude than that necessary to merely bring the stem of the pendulum into contact with the walls of the opening 73 of the washer 72, the washer 72 being slidably supported on the ring 70 will be caused to be shifted on the ring 70 to an extent depending upon the relative movement of the pendulum. Accordingly, as long as the automobile body rocks back and forth across its neutral point to an extent materially greater than necessary to bring the stem of the pendulum into contact with the washer 72, such shifting of the washer 72 on the ring 70 will occur. As the amplitude of the vibration or rocking decreases, however, a point will be reached where the movement of the stem of the pendulum in the aperture 73 of the washer 72 will be less than the diameter of the aperture 73 at which time the sliding movement of the washer 72 on the ring 70 will cease. However, due to the fact that the last movement of the washer 72 on the ring 70 has served to move the washer 72 towards a centralized position with respect to the neutral position of the stem of the pendulum under the particular circumstances, when the pendulum finally comes to rest it will be in spaced relation with respect to the walls of the opening 73 in the washer 72 and consequently no further blowing of the horn will occur.

From the above it will be appreciated that the sensitivity of the switch of the present invention, that is its capability of making contact upon rocking movement of the automobile body on its suspension springs, is dependent upon the size of the hole 73 in the washer-like element 72. In other words, the larger the hole 73 the greater rocking movement of the body required to make contact through the device, while the smaller the hole 73 the less rocking movement required to make contact. In practice it has been found that the hole 73 may be made sufficiently small to cause the device to make contact through it due to the rocking movement of the automobile body set up by simply opening a door, by striking one of the bumpers with a foot, or by some other similarly small force which would ordinarily not otherwise be considered as effective for the purpose of setting off an alarm, and yet as soon as the rocking movement ceases the contact is broken and the blowing of the horn consequently ceases. Where the device is made as sensitive as described above such slight movement of the automobile body will cause the horn to give three or four short blasts and then stop but it will be appreciated that no tire thief or the like will continue to tamper with an automobile on which a horn has so sounded, particularly if the automobile is within such distance of the owner thereof that he may hear the horn.

Because of the ability of the washer 72 to shift on the ring 70 it will be appreciated that it makes no difference in the operation of the device of the present invention whether the car is parked on a perfectly level surface or if it is parked in a non-level condition within reasonable limits. Most roadways are crowned and a car parked on the side of such roadway is necessarily tipped out of a horizontal position and under such circumstances the pendulum 76—78 will move the washer or disc-like element 72 to a corresponding position as indicated in Fig. 5, for instance. The manual switch 86 is closed when the owner of the car leaves it and although the act of the owner in getting out of the car and/or closing the door may cause the horn to give a few short blasts, the subsequent rocking of the car either side of its neutral position and eventual equalization thereof will center the stem 76 of the pendulum in the hole 73 of the washer element 72 so that as long as the automobile is not further disturbed no further blowing of the horn will occur.

It will thus be appreciated that the switch of the present invention is such as to maintain its operability regardless, within reasonable limits, of the level condition of the automobile when parked and when the device is operative, and that, therefore, the device adjusts itself to a particular inclination of the automobile when parked so as to maintain its operativeness under all conditions. It will also be appreciated that the device is extremely simple in construction and, therefore, economical to manufacture and is easily and readily applied to existing automobiles as well as to automobiles in original production.

Having thus described my invention what I claim by Letters Patent is:

1. A switch device comprising, in combination, a ring-like support of electrical conducting material adapted to be arranged with the plane thereof normally horizontal, an apertured contact element of electrical conducting material directly supported by said ring-like member in electrical contact therewith and freely shiftable thereon in any direction in approximately the plane of said ring-like member, and a pendulum supported for universal movement about a point approximately centrally of said ring-like member and vertically spaced therefrom, the stem of said pendulum projecting through said aperture in said contact element in loosely related relation with respect thereto, and the lower face of said contact element being of partially spherical conformation and of such curvature as to have a natural tendency to seat in said ring-like portion, thereby to overcome the tendency of said contact element to slide off said ring-like portion under the force of gravity when the plane of said ring-like portion is tipped a small amount out of a horizontal plane.

2. A switch device comprising, in combination, a support of electrical conducting material having a ring-like portion adapted to be normally disposed in an approximately horizontal plane, a pendulum having a stem of electrical conducting material, means fixed with respect to said support for supporting said pendulum for universal movement about a point above and approximately vertically aligned with the center of said ring-like portion, said stem of said pendulum projecting through said ring-like portion in normally materially spaced relation with respect thereto, and a contact element comprising a member having an aperture therethrough supported on said ring-like portion in electrical contact therewith and being freely shiftable thereon in approximately the plane of said ring-like portion, said stem of said pendulum projecting through said aperture of said contact element in loosely associated relation with respect thereto whereby when the plane of said ring-like portion is changed a corresponding pivotal movement of said pendulum will occur and, through engagement with the wall of said aperture, shift said contact element on said ring-like portion, said contact element having a partially spherical lower face the curvature of which is such as to impart to it a natural tendency to seat in said ring-like portion, thereby overcoming any tendency of said contact element to slide away, under the force of gravity, from its seated position on said ring-like portion as shifted by said pendulum when said ring-like portion is tipped a small amount out of its normally approximately horizontal plane, and means for connecting said ring-like portion and said stem of said pendulum in series in an electrical circuit.

PAUL T. GORTON.